(12) United States Patent
Satoh et al.

(10) Patent No.: US 10,859,130 B2
(45) Date of Patent: Dec. 8, 2020

(54) POWER TRANSMISSION DEVICE FOR VEHICLE, AND CONTROL METHOD OF POWER TRANSMISSION DEVICE

(71) Applicant: TOYOTA JIDOSHA KABUSHIKI KAISHA, Toyota (JP)

(72) Inventors: Naonari Satoh, Toyota (JP); Atsushi Ayabe, Toyota (JP); Kunio Hattori, Nagoya (JP); Yusuke Ohgata, Miyoshi (JP); Shinji Oita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/560,594

(22) Filed: Sep. 4, 2019

(65) Prior Publication Data
US 2020/0116215 A1    Apr. 16, 2020

(30) Foreign Application Priority Data

Oct. 16, 2018   (JP) .................................. 2018-195441

(51) Int. Cl.
*F16H 61/66* (2006.01)
*F16D 48/06* (2006.01)
(Continued)

(52) U.S. Cl.
CPC ............. *F16D 48/06* (2013.01); *F16D 41/04* (2013.01); *F16D 47/04* (2013.01); *F16H 37/021* (2013.01);
(Continued)

(58) Field of Classification Search
CPC .......... F16D 48/06; F16D 41/04; F16D 41/16; F16D 47/04; F16H 9/16; F16H 9/26;
(Continued)

(56) References Cited

U.S. PATENT DOCUMENTS 6,715,379 B2 * 4/2004 Miguchi ................... F16D 1/06
192/56.4
2015/0087463 A1  3/2015 Nakagawa et al.
(Continued)

FOREIGN PATENT DOCUMENTS

WO      2013/176208 A1   11/2013

OTHER PUBLICATIONS

U.S. Appl. No. 16/561,095, filed Sep. 5, 2019 in the name of Fukai et al.

*Primary Examiner* — Edwin A Young
(74) *Attorney, Agent, or Firm* — Oliff PLC

(57) ABSTRACT

A power transmission device for a vehicle includes a first power transmission path that is provided between an engine and a driving wheel, a second power transmission path that is provided in parallel with the first power transmission path, and an electronic control unit. The electronic control unit changes over a secondary clutch to a one-way mode while releasing a first clutch, when a request is made to change over a power transmission path between the engine and the driving wheel from the first power transmission path to the second power transmission path at a time of a predetermined state. The electronic control unit is configured to engage a second clutch when the secondary clutch is changed over to the one-way mode.

4 Claims, 5 Drawing Sheets

(51) Int. Cl.
  *F16D 41/04* (2006.01)
  *F16D 47/04* (2006.01)
  *F16H 37/02* (2006.01)
  F16D 41/12 (2006.01)
  F16H 1/28 (2006.01)
  F16H 9/16 (2006.01)
  F16D 41/16 (2006.01)

(52) U.S. Cl.
  CPC ............ *F16D 41/125* (2013.01); *F16D 41/16* (2013.01); *F16D 2500/10412* (2013.01); *F16D 2500/10493* (2013.01); *F16D 2500/1107* (2013.01); *F16H 1/28* (2013.01); *F16H 9/16* (2013.01); *F16H 2702/00* (2013.01)

(58) Field of Classification Search
  CPC ...... F16H 37/022; F16H 61/66; F16H 61/662; F16H 61/66272; F16H 61/70; F16H 2702/02
  See application file for complete search history.

(56) References Cited

U.S. PATENT DOCUMENTS

| | | | |
|---|---|---|---|
| 2016/0131256 A1* | 5/2016 | Toyoda | F16H 37/022 |
| | | | 701/51 |
| 2016/0305495 A1* | 10/2016 | Itagaki | B60K 6/00 |
| 2018/0274643 A1* | 9/2018 | Okoshi | F16H 37/021 |

\* cited by examiner

| | OPERATION CHART | | | |
|---|---|---|---|---|
| | C1 | C2 | B1 | TWC |
| P | | | | |
| R | | | ○ | ○ |
| N | | | | |
| D (D1) | ○ | | | |
| D (D2) | | ○ | | |
| M (M1) | ○ | | | ○ |
| M (M2) | | ○ | | |

POWER TRANSMISSION DEVICE FOR VEHICLE, AND CONTROL METHOD OF POWER TRANSMISSION DEVICE

INCORPORATION BY REFERENCE

The disclosure of Japanese Patent Application No. 2018-195441 filed on Oct. 16, 2018 including the specification, drawings and abstract is incorporated herein by reference in its entirety.

BACKGROUND

1. Technical Field

The disclosure relates to a power transmission device for a vehicle that is equipped with a first power transmission path and a second power transmission path in parallel between an engine and a driving wheel, and a method of controlling the power transmission device.

2. Description of Related Art

There is known a vehicular power transmission device that is equipped with a first power transmission path that is configured to be equipped with a first clutch and a dog clutch, and a second power transmission path that is configured to be equipped with a continuously variable transmission and a second clutch, in parallel, between an engine and a driving wheel. A power transmission device described in WO 2013/176208 is one such example. In the power transmission device of WO 2013/176208, the control of releasing the first clutch and the dog clutch and engaging the second clutch is performed in making a changeover from a state where a motive power of the engine is transmitted to the driving wheel side via the first power transmission path to a state where the motive power of the engine is transmitted to the driving wheel side via the second power transmission path.

SUMMARY

By the way, in the power transmission device described in WO 2013/176208, the dog clutch is provided in the first power transmission path. Then, when the vehicle assumes a running state where the first clutch rotates at high speed, the first clutch is prevented from rotating at high speed, by releasing the dog clutch. However, the dog clutch of WO 2013/176208 is configured to be equipped with a synchronization mechanism or the like, so the number of parts has increased and the cost of manufacturing has become high.

In contrast, for the purpose of reducing the cost, it is conceivable to adopt, instead of the dog clutch, a two-way clutch that is configured to be changeable over to a mode as a one-way clutch (hereinafter referred to as a one-way mode) in which a motive power acting in a vehicle forward direction is transmitted and a motive power acting in a vehicle backward direction is blocked and a mode (hereinafter referred to as a lock mode) in which at least rotation in the vehicle backward direction is transmitted. Thus, when the vehicle assumes the running state where the first clutch rotates at high speed, the transmission of rotation to the first clutch is blocked by the two-way clutch, and the first clutch can be prevented from rotating at high speed, by changing over the two-way clutch to the one-way mode functioning as the one-way clutch.

In the power transmission device configured as described above, the vehicle is in a driven state where rotation is transmitted from driving wheel side while coasting. In this case, when a request is made to change over the power transmission path from the first power transmission path to the second power transmission path and change over the two-way clutch from the lock mode to the one-way mode, the transmission of rotation to the two-way clutch from the driving wheel side may make it impossible to change over the two-way clutch to the one-way mode.

The disclosure makes it possible to change over a two-way clutch to a one-way mode even when a request is made to change over the two-way clutch to the one-way mode while a vehicle runs in a driven state, in a vehicular power transmission device.

A first aspect of the disclosure is a power transmission device for a vehicle. The power transmission device includes a first power transmission path that is provided between an engine and a driving wheel, a second power transmission path that is provided between the engine and the driving wheel and that is provided in parallel with the first power transmission path, and an electronic control unit. The first power transmission path includes a first clutch and a secondary clutch, and is configured to transmit a motive power from the engine to the driving wheel by engaging the first clutch. The secondary clutch is configured to transmit the motive power to the driving wheel with the vehicle in a driving state. The secondary clutch is configured to make a changeover between a one-way mode and a lock mode. The one-way mode ensures that the motive power is transmitted to the driving wheel with the vehicle in the driving state, and that the motive power is blocked with the vehicle in a driven state. The lock mode ensures that the motive power is transmitted to the driving wheel with the vehicle in the driving state and the driven state. The secondary clutch includes an input-side rotary member, an output-side rotary member, and an intermediate member. The input-side rotary member is coupled to the engine in such a manner as to enable transmission of the motive power. The output-side rotary member is coupled to the driving wheel in such a manner as to enable transmission of the motive power. The intermediate member is interposed between the input-side rotary member and the output-side rotary member. The intermediate member is configured to keep the input-side rotary member and the output-side rotary member from rotating relatively to each other, by abutting on the input-side rotary member and the output-side rotary member, when the vehicle assumes the driven state, in the lock mode. The second power transmission path includes a continuously variable transmission and a second clutch, and is configured to transmit the motive power from the engine to the driving wheel by engaging the second clutch. The electronic control unit is configured to change over the secondary clutch to the one-way mode while releasing the first clutch when a request is made to change over a power transmission path between the engine and the driving wheel from the first power transmission path to the second power transmission path at a time of a predetermined state. The predetermined state is a state where the vehicle is in the driven state and runs with the secondary clutch in the lock mode. The electronic control unit is configured to engage the second clutch when the secondary clutch is changed over to the one-way mode.

With the aforementioned configuration, when a request is made to change over the power transmission path from the first power transmission path to the second power transmission path while the vehicle is in the driven state and runs with the secondary clutch in the lock mode, the first power transmission path is rendered in a neutral state, by releasing the first clutch. The secondary clutch can be changed over to the one-way mode, by performing the control of changing over the secondary clutch to the one-way mode in this state.

In the power transmission device for the vehicle, the electronic control unit may be configured to determine that the secondary clutch has been changed over to the one-way mode, when a difference in rotational speed between an output rotational speed of the output-side rotary member of the secondary clutch and an input rotational speed of the input-side rotary member of the secondary clutch becomes equal to or larger than a determination threshold set in advance.

With the aforementioned configuration, it can be easily determined that the secondary clutch has been changed over to the one-way mode, by calculating the difference in rotational speed between the output rotational speed of the output-side rotary member and the input rotational speed of the input-side rotary member.

In the power transmission device for the vehicle, the electronic control unit may be configured to determine that the secondary clutch has been changed over to the one-way mode, when an elapsed time since start of the changeover of the secondary clutch to the one-way mode becomes equal to or longer than a changeover completion time set in advance.

With the aforementioned configuration, it can be easily determined that the secondary clutch has been changed over to the one-way mode, by detecting the elapsed time since start of the changeover of the secondary clutch to the one-way mode.

A second aspect of the disclosure is a control method of a power transmission device. The power transmission device includes a first power transmission path that is provided between an engine and a driving wheel, a second power transmission path that is provided between the engine and the driving wheel and that is provided in parallel with the first power transmission path, and an electronic control unit. The first power transmission path includes a first clutch and a secondary clutch, and is configured to transmit a motive power from the engine to the driving wheel by engaging the first clutch. The secondary clutch is configured to transmit the motive power to the driving wheel with a vehicle in a driving state. The secondary clutch is configured to make a changeover between a one-way mode and a lock mode. The one-way mode ensures that the motive power is transmitted to the driving wheel with the vehicle in the driving state, and that the motive power is blocked with the vehicle in a driven state. The lock mode ensures that the motive power is transmitted to the driving wheel with the vehicle in the driving state and the driven state. The secondary clutch includes an input-side rotary member, an output-side rotary member, and an intermediate member. The input-side rotary member is coupled to the engine in such a manner as to enable transmission of the motive power. The output-side rotary member is coupled to the driving wheel in such a manner as to enable transmission of the motive power. The intermediate member is interposed between the input-side rotary member and the output-side rotary member. The intermediate member is configured to keep the input-side rotary member and the output-side rotary member from rotating relatively to each other, by abutting on the input-side rotary member and the output-side rotary member, when the vehicle assumes the driven state, in the lock mode. The second power transmission path includes a continuously variable transmission and a second clutch, and is configured to transmit the motive power from the engine to the driving wheel by engaging the second clutch. The method includes changing over, by the electronic control unit, the secondary clutch to the one-way mode while releasing, by the electronic control unit, the first clutch when a request is made to change over a power transmission path between the engine and the driving wheel from the first power transmission path to the second power transmission path at a time of a predetermined state. The predetermined state is a state where the vehicle is in the driven state and runs with the secondary clutch in the lock mode. The method further includes engaging, by the electronic control unit, the second clutch when the secondary clutch is changed over to the one-way mode.

With the aforementioned configuration, when a request is made to change over the power transmission path from the first power transmission path to the second power transmission path while the vehicle is in the driven state and runs with the secondary clutch in the lock mode, the first power transmission path is rendered in a neutral state, by releasing the first clutch. The secondary clutch can be changed over to the one-way mode, by performing the control of changing over the secondary clutch to the one-way mode in this state.

BRIEF DESCRIPTION OF THE DRAWINGS

Features, advantages, and technical and industrial significance of an exemplary embodiment of the disclosure will be described below with reference to the accompanying drawings, in which like numerals denote like elements, and wherein.

DETAILED DESCRIPTION OF EMBODIMENT

The embodiment of the disclosure will be described hereinafter in detail with reference to the drawings. Incidentally, the drawings are simplified or transformed as appropriate in the following embodiment, and the dimensional ratios, shapes, and the like of respective components are not necessarily depicted with precision.

Figure 1:
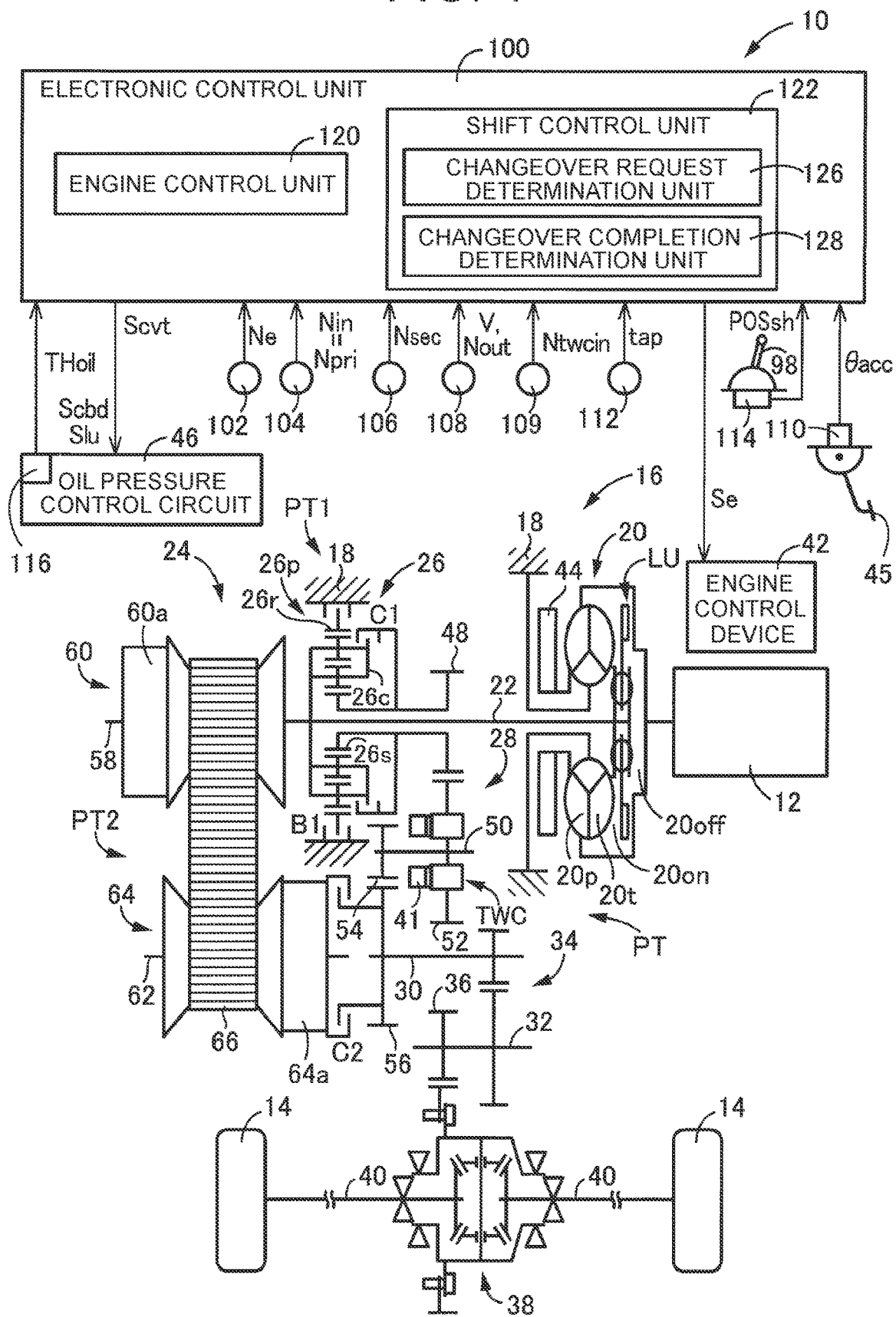
FIG. 1 is a view illustrating the schematic configuration of a vehicle to which the disclosure is applied, and is a view illustrating an essential part of a control system and control functions for various kinds of control in the vehicle.

FIG. 1 is a view illustrating the schematic configuration of a vehicle 10 to which the disclosure is applied, and is a view illustrating an essential part of a control system and control functions for various kinds of control in the vehicle 10. In FIG. 1, the vehicle 10 is equipped with a vehicular power transmission device 16 (hereinafter referred to as the power transmission device 16) that transmits a motive power of an engine 12 functioning as a motive power source to driving wheels 14.

The power transmission device 16 is provided between the engine 12 and the driving wheels 14. The power transmission device 16 is equipped with a known torque converter 20 as a hydraulic transmission device that is coupled to the engine 12, an input shaft 22 that is coupled to the torque converter 20, a belt-type continuously variable transmission 24 that is coupled to the input shaft 22, a forward/backward changeover device 26 that is also coupled to the input shaft 22, a gear mechanism 28 that is coupled to the input shaft 22 via the forward/backward changeover device 26 and that is provided in parallel with the continuously variable transmission 24, an output shaft 30 as an output rotary member that is common to the continuously variable transmission 24 and the gear mechanism 28, a countershaft 32, a reduction gear device 34 that is constituted of a pair of gears that are provided on the output shaft 30 and the countershaft 32 respectively in a relatively unrotatable manner and that mesh with each other, a gear 36 that is provided on the countershaft 32 in a relatively unrotatable manner, a differential device 38 that is coupled to the gear 36 in such a manner as to enable transmission of a motive power, and right and left axles 40 that are coupled to the differential device 38, in a case 18 as a non-rotary member.

In the power transmission device 16 thus configured, the motive power output from the engine 12 is transmitted to the right and left driving wheels 14 sequentially via the torque converter 20, the forward/backward changeover device 26, the gear mechanism 28, the reduction gear device 34, the differential device 38, the axles 40 and the like. Alternatively, in the power transmission device 16, the motive power output from the engine 12 is transmitted to the right and left driving wheels 14 sequentially via the torque converter 20, the continuously variable transmission 24, the reduction gear device 34, the differential device 38, the axles 40 and the like. The motive power is synonymous with a torque or a power when they are not distinguished from each other in particular.

As described above, the power transmission device 16 is equipped with the gear mechanism 28 and the continuously variable transmission 24, which are provided in parallel with the power transmission path PT between the engine 12 and the driving wheels 14. That is, the power transmission device 16 is equipped with two power transmission paths that are provided in parallel with each other between the input shaft 22 and the output shaft 30 and that each enable transmission of the motive power of the engine 12 from the input shaft 22 to the output shaft 30. The two power transmission paths are a first power transmission path PT1 that extends via the gear mechanism 28, and a second power transmission path PT2 that extends via the continuously variable transmission 24. As described hitherto, the power transmission device 16 is equipped with the two power transmission paths, namely, the first power transmission path PT1 and the second power transmission path PT2, in parallel with each other between the input shaft 22 and the output shaft 30.

The first power transmission path PT1 is a power transmission path that is equipped with the forward/backward changeover device 26 including a first clutch C1 and a first brake B1, the gear mechanism 28, and a two-way clutch TWC functioning as a secondary clutch, and that ensures that the motive power of the engine 12 is transmitted from the input shaft 22 to the driving wheels 14 via the gear mechanism 28. In the first power transmission path PT1, the forward/backward changeover device 26, the gear mechanism 28, and the two-way clutch TWC are arranged in this sequence from the engine 12 toward the driving wheels 14. That is, the first clutch C1 is arranged on the engine 12 side with respect to the two-way clutch TWC. The second power transmission path PT2 is a power transmission path that is equipped with the continuously variable transmission 24 and a second clutch C2, and that ensures that the motive power of the engine 12 is transmitted from the input shaft 22 to the driving wheels 14 via the continuously variable transmission 24. In the second power transmission path PT2, the continuously variable transmission 24 and the second clutch C2 are arranged in this sequence from the engine 12 toward the driving wheels 14.

Besides, a gear ratio EL in the first power transmission path PT1 that is constituted of the gear mechanism 28 (=an input shaft rotational speed Nin/an output shaft rotational speed Nout) is set to a value larger than a lowermost speed ratio $\gamma$max of the continuously variable transmission 24 as a maximum speed ratio in the second power transmission path PT2. That is, the gear ratio EL is set as a speed ratio that is lower than the lowermost speed ratio $\gamma$max. Thus, a higher speed ratio is formed in the second power transmission path PT2 than in the first power transmission path PT1. Incidentally, the input shaft rotational speed Nin is a rotational speed of the input shaft 22, and the output shaft rotational speed Nout is a rotational speed of the output shaft 30.

The continuously variable transmission 24 is equipped with a primary shaft 58 that is provided coaxially with the input shaft 22 and that is integrally coupled to the input shaft 22, a primary pulley 60 that is coupled to the primary shaft 58 and whose effective diameter is variable, a secondary shaft 62 that is provided coaxially with the output shaft 30, a secondary pulley 64 that is coupled to the secondary shaft 62 and whose effective diameter is variable, and a transmission belt 66 as a transmission element that is wound between the respective pulleys 60 and 64. The continuously variable transmission 24 is a known belt-type continuously variable transmission that carries out transmission of the motive power via a frictional force between each of the pulleys 60 and 64 and the transmission belt 66. The continuously variable transmission 24 transmits the motive power of the engine 12 to the driving wheel 14 sides. The effective diameter of the primary pulley 60 is changed by a hydraulic actuator 60a, and the effective diameter of the secondary pulley 64 is changed by a hydraulic actuator 64a.

In the power transmission device 16, the power transmission path through which the motive power of the engine 12 is transmitted to the driving wheels 14 is changed over between the first power transmission path PT1 and the second power transmission path PT2 in accordance with the running state of the vehicle 10. Therefore, the power transmission device 16 is equipped with a plurality of engagement devices for selectively forming the first power transmission path PT1 and the second power transmission path PT2. The plurality of the engagement devices include the first clutch C1, the first brake B1, the second clutch C2, and the two-way clutch TWC.

The first clutch C1 is an engagement device that is provided on the first power transmission path PT1 and that is designed to selectively connect and disconnect the first power transmission path PT1, and is an engagement device that enables the first power transmission path PT1 to transmit the motive power by being engaged when the vehicle runs forward. The first brake B1 is provided on the first power transmission path PT1 and is designed to selectively connect and disconnect the first power transmission path PT1, and is an engagement device that enables the first power transmission path PT1 to transmit the motive power by being engaged when the vehicle runs backward. The first power transmission path PT1 is formed through engagement of the first clutch C1 or the first brake B1.

The two-way clutch TWC is provided in the first power transmission path PT1, and is configured to be changeable over to a one-way mode in which the motive power is transmitted when the vehicle 10 is in a driving state while running forward and the motive power is blocked when the vehicle 10 is in a driven state while running forward, and a lock mode in which the motive power is transmitted when the vehicle 10 is in the driving state and the driven state. For example, with the first clutch C1 engaged and with the two-way clutch TWC changed over to the one-way mode, the two-way clutch TWC enables transmission of the motive power when the vehicle 10 is in the driving state while being caused to run forward by the motive power of the engine 12. That is, the motive power of the engine 12 is transmitted to the driving wheel 14 sides via the first power transmission path PT1 while the vehicle runs forward. On the other hand, in the case where the vehicle 10 is in the driven state, for example, while coasting, even when the first clutch C1 is engaged, the rotation transmitted from the driving wheel 14 sides is blocked by the two-way clutch TWC. Incidentally, the driving state of the vehicle 10 corresponds to a state where the torque of the input shaft 22 assumes a positive value with respect to a traveling direction, substantially to a state where the vehicle 10 is driven by the motive power of the engine 12. Besides, the driven state of the vehicle 10 corresponds to a state where the torque of the input shaft 22 assumes a negative value with respect to the traveling direction, substantially to a state where the vehicle 10 is caused to coast and the input shaft 22 and the engine 12 are dragged through the rotation transmitted from the driving wheel 14 sides.

Besides, with the first clutch C1 engaged and with the two-way clutch TWC changed over to the lock mode, the two-way clutch TWC enables transmission of the motive power when the vehicle 10 is in the driving state and the driven state, and the motive power of the engine 12 is transmitted to the driving wheel 14 sides via the first power transmission path PT1. Also, while the vehicle coasts (in the driven state), the rotation transmitted from the driving wheel 14 sides is transmitted to the engine 12 side via the first power transmission path PT1, and the engine 12 is thereby dragged, so engine braking can be caused. Besides, with the first brake B1 engaged and with the two-way clutch TWC changed over to the lock mode, the motive power transmitted from the engine 12 side and acting in a vehicle backward direction is transmitted to the driving wheels 14 via the two-way clutch TWC, and the vehicle can run backward with the motive power transmitted via the first power transmission path PT1. Incidentally, the structure of the two-way clutch TWC will be described later.

The second clutch C2 is an engagement device that is provided in the second power transmission path PT2 and that is designed to selectively connect and disconnect the second power transmission path PT2, and is an engagement device that enables the second power transmission path PT2 to transmit the motive power by being engaged when the vehicle runs forward. Each of the first clutch C1, the first brake B1, and the second clutch C2 is a known hydraulic wet frictional engagement device that is frictionally engaged by a hydraulic actuator. Each of the first clutch C1 and the first brake B1 is an element that constitutes the forward/backward changeover device 26.

The engine 12 is equipped with an engine control device 42 having various pieces of equipment that are needed to perform output control of the engine 12, such as an electronic throttle device, a fuel injection device, an ignition device and the like. The engine control device 42 of the engine 12 is controlled in accordance with an accelerator operation amount θacc as an operation amount of an accelerator pedal 45 corresponding to an amount of a driving request made by a driver for the vehicle 10, by an electronic control unit 100 that will be described later. Thus, an engine torque Te as an output torque of the engine 12 is controlled.

The torque converter 20 is equipped with a pump impeller 20p that is provided between the engine 12 and the continuously variable transmission 24 and between the engine 12 and the forward/backward changeover device 26 and that is coupled to the engine 12, and a turbine impeller 20t that is coupled to the input shaft 22. The torque converter 20 is a fluid transmission device that transmits the motive power of the engine 12 to the input shaft 22. The torque converter 20 is equipped with a known lockup clutch LU that can directly couple the pump impeller 20p and the turbine impeller 20t, namely, input and output rotary members of the torque converter 20 to each other. The lockup clutch LU directly couples the pump impeller 20p and the turbine impeller 20t (i.e., the engine 12 and the input shaft 22) to each other in accordance with a running state of the vehicle. For example, in a relatively high vehicle speed range, the engine 12 and the input shaft 22 are directly coupled to each other by the lockup clutch LU.

The power transmission device 16 is equipped with a mechanical oil pump 44 that is coupled to the pump impeller 20p. By being rotationally driven by the engine 12, the oil pump 44 supplies an original pressure of a working fluid pressure for performing shift control of the continuously variable transmission 24, generating a belt clamping force in the continuously variable transmission 24, changing over an operation state such as engagement, release and the like of each of the plurality of the engagement devices, and changing over an operation state of the lockup clutch LU to an oil pressure control circuit 46 with which the vehicle 10 is equipped.

The forward/backward changeover device 26 is equipped with a double pinion-type planetary gear device 26p, the first clutch C1, and the first brake B1. The planetary gear device 26p is a differential mechanism having three rotary elements, namely, a carrier 26c as an input element, a sun gear 26s as an output element, and a ring gear 26r as a reaction element. The carrier 26c is coupled to the input shaft 22. The ring gear 26r is selectively coupled to the case 18 via the first brake B1. The sun gear 26s is coupled to a small-diameter gear 48 that is arranged on an outer peripheral side of the input shaft 22 and that is provided in such a manner as to enable rotation relative to the input shaft 22. The carrier 26c and the sun gear 26s are selectively coupled to each other via the first clutch C1.

The gear mechanism 28 is equipped with the small-diameter gear 48, a countershaft 50, and a large-diameter gear 52 that is provided on the countershaft 50 in such a manner as to enable rotation relative thereto and that meshes with the small-diameter gear 48. Besides, a counter gear 54 that meshes with an output gear 56 provided on the output shaft 30 is provided on the countershaft 50 unrotatably relatively thereto.

The two-way clutch TWC is provided between the large-diameter gear 52 and the counter gear 54 in an axial direction of the countershaft 50. The two-way clutch TWC is provided on the driving wheel 14 sides with respect to the first clutch C1 and the gear mechanism 28, in the first power transmission path PT1. The two-way clutch TWC is changed over to one of the one-way mode and the lock mode, by a hydraulic actuator 41 that is provided adjacent to the two-way clutch TWC in the axial direction of the countershaft 50.

Figure 2:
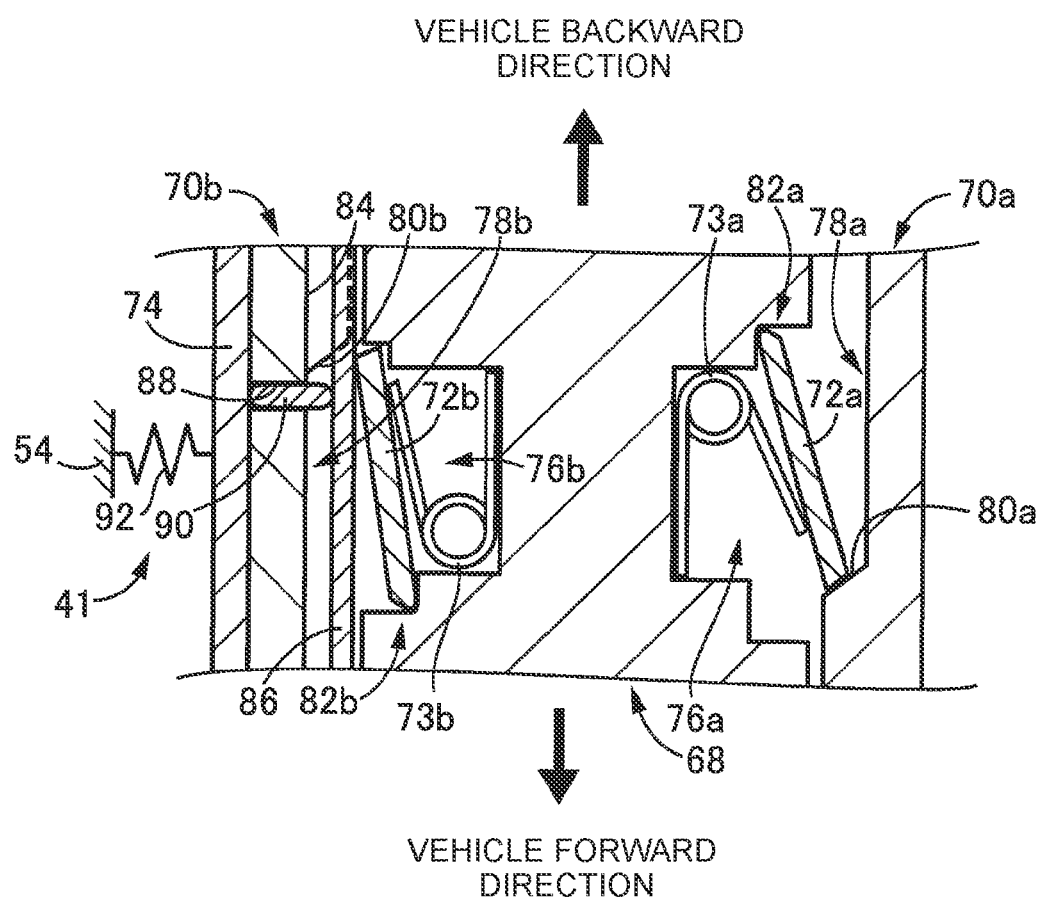
FIG. 2 is a view showing the structure of a two-way clutch of FIG. 1 in a simplified manner, and is a cross-sectional view with part of the structure in a circumferential direction cut off upon a changeover to a one-way mode.
Figures 3, 4:
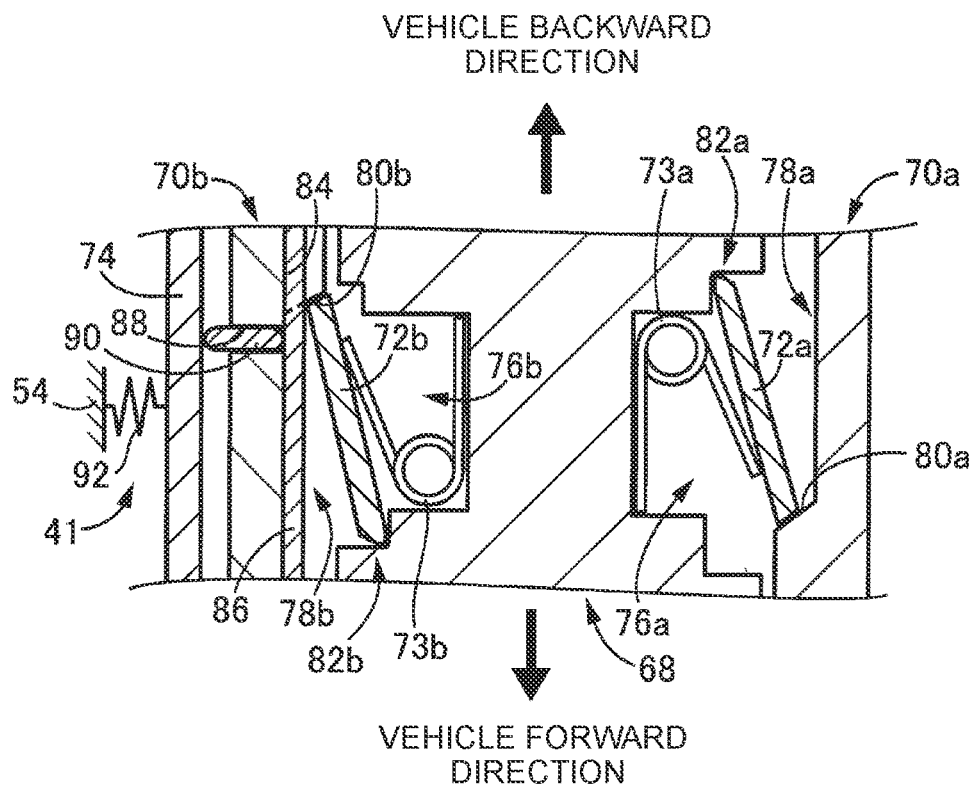
FIG. 3 is a view showing the structure of the two-way clutch of FIG. 1 in a simplified manner, and is a cross-sectional view with part of the structure in the circumferential direction cut off upon a changeover to a lock mode.
FIG. 4 is an engagement operation chart showing engagement states of respective engagement devices at each of operation positions selected by a shift lever as a shift changeover device with which the vehicle is equipped.

Each of FIGS. 2 and 3 is a view showing, in a simplified manner, the structure of the two-way clutch TWC that enables a changeover in mode to the one-way mode and the lock mode, and is a cross-sectional view with part of the two-way clutch TWC in a circumferential direction thereof cut off. FIG. 2 shows a state where the two-way clutch TWC has been changed over to the one-way mode, and FIG. 3 shows a state where the two-way clutch TWC has been changed over to the lock mode. Incidentally, a vertical direction on the sheet of each of FIGS. 2 and 3 corresponds to a rotational direction, an upward direction on the sheet corresponds to the vehicle backward direction (a backward rotational direction), and a downward direction on the sheet corresponds to a vehicle forward direction (a forward rotational direction). Besides, a lateral direction on the sheet of each of FIGS. 2 and 3 corresponds to the axial direction of the countershaft 50 (it will be assumed hereinafter that the axial direction corresponds to the axial direction of the countershaft 50, unless otherwise specified), a right side on the sheet corresponds to the large-diameter gear 52 side of FIG. 1, and a left side on the sheet corresponds to the counter gear 54 side of FIG. 1.

The two-way clutch TWC is formed in the shape of a circular disc, and is arranged on an outer peripheral side of the countershaft 50. The two-way clutch TWC is configured to include an input-side rotary member 68, a first output-side rotary member 70*a* and a second output-side rotary member 70*b* that are arranged at a position that is adjacent to the input-side rotary member 68 in the axial direction, a plurality of first struts 72*a* and a plurality of torsion coil springs 73*a* that are interposed between the input-side rotary member 68 and the first output-side rotary member 70*a* in the axial direction, and a plurality of second struts 72*b* and a plurality of torsion coil springs 73*b* that are interposed between the input-side rotary member 68 and the second output-side rotary member 70*b* in the axial direction. Incidentally, the second output-side rotary member 70*b* corresponds to the output-side rotary member of the disclosure, and the second struts 72*b* correspond to the intermediate member of the disclosure.

The input-side rotary member 68 is formed in the shape of a circular disc, and is arranged in such a manner as to enable rotation relative to the countershaft 50 around a shaft center of the countershaft 50. The input-side rotary member 68 is arranged in such a manner as to be sandwiched between the first output-side rotary member 70*a* and the second output-side rotary member 70*b* in the axial direction. Besides, meshing teeth of the large-diameter gear 52 are integrally formed on an outer peripheral side of the input-side rotary member 68. That is, the input-side rotary member 68 and the large-diameter gear 52 are integrally molded. The input-side rotary member 68 is coupled to the engine 12 in such a manner as to enable transmission of the motive power, via the gear mechanism 28, the forward/backward changeover device 26, and the like.

First accommodation portions 76*a* in which the first struts 72*a* and the torsion coil springs 73*a* are accommodated respectively are formed on that surface of the input-side rotary member 68 which is opposed to the first output-side rotary member 70*a* in the axial direction. A plurality of the first accommodation portions 76*a* are formed at equal angular intervals in the circumferential direction. Besides, second accommodation portions 76*b* in which the second struts 72*b* and the torsion coil springs 73*b* are accommodated respectively are formed on that surface of the input-side rotary member 68 which is opposed to the second output-side rotary member 70*b* in the axial direction. A plurality of the accommodation portions 76*b* are formed at equal angular intervals in the circumferential direction. The first accommodation portions 76*a* and the second accommodation portions 76*b* are formed at the same positions respectively in a radial direction of the input-side rotary member 68.

The first output-side rotary member 70*a* is formed in the shape of a circular disc, and is arranged rotatably around the shaft center of the countershaft 50. The first output-side rotary member 70*a* is provided in such a manner as to disable rotation relative to the countershaft 50, and hence rotates integrally with the countershaft 50. In this connection, the first output-side rotary member 70*a* is coupled to the driving wheels 14 in such a manner as to enable transmission of the motive power, via the countershaft 50, the counter gear 54, the output shaft 30, the differential device 38, and the like.

First recess portions 78*a* that are recessed in a direction away from the input-side rotary member 68 are formed in that surface of the first output-side rotary member 70*a* which is opposed to the input-side rotary member 68 in the axial direction. The first recess portions 78*a* thus formed are equal in number to the first accommodation portions 76*a*, and are arranged at equal angular intervals in the circumferential direction. Besides, the first recess portions 78*a* are formed at the same positions as the first accommodation portions 76*a* that are formed on the input-side rotary member 68, respectively, in a radial direction of the first output-side rotary member 70*a*. Accordingly, when the rotational position of each of the first accommodation portions 76*a* and the rotational position of each of the first recess portions 78*a* coincide with each other, each of the first accommodation portions 76*a* and each of the first recess portions 78*a* are adjacent to each other in the axial direction. Each of the first recess portions 78*a* has a shape that enables accommodation of one end of each of the first struts 72*a*. Besides, each of first wall surfaces 80*a* that abuts on one end of each of the first struts 72*a* when the input-side rotary member 68 rotates in the vehicle forward direction (downward on the sheet of each of FIGS. 2 and 3) due to the motive power of the engine 12 is formed at one end of each of the first recess portions 78*a* in the circumferential direction.

The second output-side rotary member 70*b* is formed in the shape of a circular disc, and is arranged rotatably around the shaft center of the countershaft 50. The second output-side rotary member 70*b* is provided on the countershaft 50 in such a manner as to disable rotation relative thereto, and hence rotates integrally with the countershaft 50. In this connection, the second output-side rotary member 70*b* is coupled to the driving wheels 14 in such a manner as to enable transmission of the motive power, via the countershaft 50, the counter gear 54, the output shaft 30, the differential device 38, and the like.

Second recess portions 78*b* that are recessed in the direction away from the input-side rotary member 68 are formed in that surface of the second output-side rotary member 70*b* which is opposed to the input-side rotary member 68 in the axial direction. The second recess portions 78b thus formed are equal in number to the second accommodation portions 76b, and are arranged at equal angular intervals in the circumferential direction. Besides, the second recess portions 78b are formed at the same positions as the second accommodation portions 76b that are formed on the input-side rotary member 68, respectively, in a radial direction of the second output-side rotary member 70b. Accordingly, when the rotational position of each of the second accommodation portions 76b and the rotational position of each of the second recess portions 78b coincide with each other, each of the second accommodation portions 76b and each of the second recess portions 78b are adjacent to each other in the axial direction. Each of the second recess portions 78b has a shape that enables accommodation of one end of each of the second struts 72b. Besides, each of second wall surfaces 80b that abuts on one end of each of the second struts 72b when the input-side rotary member 68 rotates in the vehicle backward direction (upward on the sheet of each of FIGS. 2 and 3) due to the motive power of the engine 12 with the two-way clutch TWC shown in FIG. 3 changed over to the lock mode and when the vehicle is caused to coast while running forward is formed at one end of each of the second recess portions 78b in the circumferential direction.

Each of the first struts 72a is a plate-like member having a predetermined thickness, and is formed lengthwise along the rotational direction (the vertical direction on the sheet) as indicated by the cross-sections of FIGS. 2 and 3. Besides, each of the first struts 72a has a predetermined dimension in a direction perpendicular to the sheet of each of FIGS. 2 and 3.

One end of each of the first struts 72a in a longitudinal direction thereof is urged toward the first output-side rotary member 70 side by each of the torsion coil springs 73a. Besides, the other end of each of the first struts 72a in the longitudinal direction thereof is held in abutment on each of first step portions 82a that is formed in each of the first accommodation portions 76a. Each of the first struts 72a can turn around the other end thereof that abuts on each of the first step portions 82a. Each of the torsion coil springs 73a is interposed between each of the first struts 72a and the input-side rotary member 68, and urges one end of each of the first struts 72a toward the first output-side rotary member 70a.

By being configured as described above, each of the first struts 72a has one end thereof abutting on each of the first wall surfaces 80a of the first output-side rotary member 70a and the other end thereof abutting on each of the first step portions 82a of the input-side rotary member 68, when the motive power acting in the vehicle forward direction is transmitted thereto from the engine 12 side, with the two-way clutch TWC changed over to the one-way mode and the lock mode. In this state, the input-side rotary member 68 and the first output-side rotary member 70a are kept from rotating relatively to each other, and the motive power acting in the vehicle forward direction is transmitted to the driving wheel 14 sides via the two-way clutch TWC. The aforementioned first struts 72a, the aforementioned torsion coil springs 73a, the aforementioned first accommodation portions 76a, and the aforementioned first recess portions 78a (the first wall surfaces 80a) constitute the one-way clutch that transmits the motive power acting in the vehicle forward direction to the driving wheels 14 and that blocks the motive power acting in the vehicle backward direction.

Each of the second struts 72b is a plate-like member having a predetermined thickness, and is formed lengthwise along the rotational direction (the vertical direction on the sheet) as indicated by the cross-sections of FIGS. 2 and 3. Besides, each of the second struts 72b has a predetermined dimension in a direction perpendicular to the sheet of each of FIGS. 2 and 3.

One end of each of the second struts 72b in a longitudinal direction thereof is urged toward the second output-side rotary member 70b side by each of the torsion coil springs 73b. Besides, the other end of each of the second struts 72b in the longitudinal direction thereof is held in abutment on each of second step portions 82b that is formed in each of the second accommodation portions 76b. Each of the second struts 72b can turn around the other end thereof that abuts on each of the second step portions 82b. Each of the torsion coil springs 73b is interposed between each of the second struts 72b and the input-side rotary member 68, and urges one end of each of the second struts 72b toward the second output-side rotary member 70b.

By being configured as described above, each of the second struts 72b has one end thereof abutting on each of the second wall surfaces 80b of the second output-side rotary member 70b and the other end thereof abutting on each of the second step portions 82b of the input-side rotary member 68, when the motive power acting in the vehicle backward direction is transmitted thereto from the engine 12 side, with the two-way clutch TWC changed over to the lock mode. Besides, each of the second struts 72b has one end thereof abutting on each of the second wall surfaces 80b of the second output-side rotary member 70b and the other end thereof abutting on each of the second step portions 82b of the input-side rotary member 68, when the vehicle is caused to coast while running forward as well. In this state, the input-side rotary member 68 and the second output-side rotary member 70b are kept from rotating relatively to each other, and the motive power acting in the vehicle backward direction is transmitted to the driving wheels 14 via the two-way clutch TWC. Besides, the rotation transmitted from the driving wheel 14 sides while coasting is transmitted to the engine 12 side via the two-way clutch TWC. The aforementioned second struts 72b, the aforementioned torsion coil springs 73b, the aforementioned second accommodation portions 76b, and the aforementioned second recess portions 78b (the second wall surfaces 80b) constitute the one-way clutch that transmits the motive power acting in the vehicle backward direction to the driving wheels 14 and that blocks the motive power acting in the vehicle forward direction.

Besides, a plurality of through-holes 88 that penetrate the second output-side rotary member 70b in the axial direction are formed through the second output-side rotary member 70b. Each of the through-holes 88 is formed at a position overlapping with each of the second recess portions 78b as viewed in the axial direction of the countershaft 50. Accordingly, one end of each of the through-holes 88 communicates with each of the second recess portions 78b. Pins 90 are inserted through the through-holes 88 respectively. Each of the pins 90 is formed in the shape of a circular cylinder, and can slide within each of the through-holes 88. One end of each of the pins 90 is held in abutment on a pressing plate 74 that constitutes the hydraulic actuator 41, and the other end of each of the pins 90 is held in abutment on each of annular rings 86 whose part in the circumferential direction thereof extends through each of the second recess portions 78b.

The rings 86 are fitted in a plurality of arc-like grooves 84 that are formed in such a manner as to join the second recess portions 78b that are formed in the second output-side rotary member 70b and that are adjacent to each other in the circumferential direction, respectively, and are allowed to move relatively to the second output-side rotary member 70b in the axial direction.

The hydraulic actuator 41 is arranged on the countershaft 50 as is the case with the two-way clutch TWC, and at a position that is adjacent to the second output-side rotary member 70b in the axial direction of the countershaft 50. The hydraulic actuator 41 is equipped with the pressing plate 74, a plurality of coil springs 92 that are interposed between the counter gear 54 and the pressing plate 74 in the axial direction, and a hydraulic chamber that generates a thrust force for moving the pressing plate 74 toward the counter gear 54 side in the axial direction by being supplied with working fluid.

The pressing plate 74 is formed in the shape of a circular plate, and is arranged in such a manner as to enable its movement relative to the countershaft 50 in the axial direction. The springs 92 urge the pressing plate 74 toward the second output-side rotary member 70b side in the axial direction. Accordingly, with no working fluid supplied to the hydraulic chamber of the hydraulic actuator 41, the pressing plate 74 is moved toward the second output-side rotary member 70b side in the axial direction due to the urging force of the springs 92, and the pressing plate 74 is brought into contact with the second output-side rotary member 70b, as shown in FIG. 2. At this time, as shown in FIG. 2, each of the pins 90, each of the rings 86, and one end of each of the second struts 72b are moved toward the input-side rotary member 68 side in the axial direction, and the two-way clutch TWC is thereby changed over to the one-way mode.

Besides, when working fluid is supplied to the hydraulic chamber of the hydraulic actuator 41, the pressing plate 74 is moved toward the counter gear 54 side in the axial direction against the urging force of the springs 92, and the pressing plate 74 is spaced apart from the second output-side rotary member 70b. At this time, as shown in FIG. 3, each of the pins 90, each of the rings 86, and one end of each of the second struts 72b are moved toward the counter gear 54 side in the axial direction, due to the urging force of the torsion coil springs 73b, and the two-way clutch TWC is thereby changed over to the lock mode.

With the two-way clutch TWC shown in FIG. 2 in the one-way mode, the pressing plate 74 is brought into abutment on the second output-side rotary member 70b due to the urging force of the springs 92. At this time, the pins 90 are pressed by the pressing plate 74 and moved toward the input-side rotary member 68 side in the axial direction, and the rings 86 are also pressed by the pins 90 respectively and moved toward the input-side rotary member 68 side in the axial direction. As a result, one end of each of the second struts 72b is pressed against each of the rings 86 and moved toward the input-side rotary member 68 side. Thus, one end of each of the second struts 72b and each of the second wall surfaces 80b are kept from abutting on each other. At this time, the input-side rotary member 68 and the second output-side rotary member 70b are allowed to rotate relatively to each other, and the second struts 72b do not function as a one-way clutch. On the other hand, one end of the first struts 72a is urged toward the first output-side rotary member 70a side by each of the torsion coil springs 73a, and hence can abut on each of the first wall surfaces 80a of the first recess portions 78a. Thus, the first struts 72a function as a one-way clutch that transmits a driving force acting in the vehicle forward direction.

With the two-way clutch TWC shown in FIG. 2 in the one-way mode, one end of each of the first struts 72a can abut on each of the first wall surfaces 80a of the first output-side rotary member 70a. Thus, when the vehicle 10 assumes the driving state where the motive power acting in the vehicle forward direction is transmitted from the engine 12 to the two-way clutch TWC, one end of each of the first struts 72a and each of the first wall surfaces 80a abut on each other, and the other end of each of the first struts 72a and each of the first step portions 82a abut on each other as shown in FIG. 2. Thus, the input-side rotary member 68 and the first output-side rotary member 70a are kept from rotating relatively to each other in the vehicle forward direction, and the motive power of the engine 12 is transmitted to the driving wheels 14 via the two-way clutch TWC. On the other hand, when the vehicle 10 assumes the driven state by being caused to coast while running forward, one end of each of the first struts 72a and each of the first wall surfaces 80a of the first output-side rotary member 70a do not abut on each other, and the input-side rotary member 68 and the first output-side rotary member 70a are allowed to rotate relatively to each other. Thus, the transmission of the motive power via the two-way clutch TWC is blocked. In consequence, with the two-way clutch TWC in the one-way mode, the first struts 72a function as a one-way clutch. With the vehicle 10 in the driving state where the motive power acting in the vehicle forward direction is transmitted from the engine 12, the motive power is transmitted. On the other hand, with the vehicle 10 in the driven state where the vehicle 10 is caused to coast while running forward, the motive power is blocked.

With the two-way clutch TWC shown in FIG. 3 in the lock mode, working fluid is supplied to the hydraulic chamber of the hydraulic actuator 41, and the pressing plate 74 is thereby moved in a direction away from the second output-side rotary member 70b against the urging force of the springs 92. At this time, one end of each of the second struts 72b is moved toward each of the second recess portion 78b sides of the second output-side rotary member 70b due to the urging force of each of the torsion coil springs 73b, and can abut on each of the second wall surfaces 80b. Besides, as is the case with the one-way mode of FIG. 2, one end of each of the first struts 72a can abut on each of the first wall surfaces 80a of the first output-side rotary member 70a.

When the motive power acting in the vehicle forward direction is transmitted with the two-way clutch TWC shown in FIG. 3 in the lock mode, one end of each of the first struts 72a abuts on each of the first wall surfaces 80a of the first output-side rotary member 70a, and the other end of each of the first struts 72a abuts on each of the first step portions 82a. Thus, the input-side rotary member 68 and the first output-side rotary member 70a are kept from rotating relatively to each other in the vehicle forward direction. Furthermore, when the motive power acting in the vehicle backward direction is transmitted with the two-way clutch TWC in the lock mode, one end of each of the second struts 72b abuts on each of the second wall surfaces 80b of the second output-side rotary member 70b, and the other end of each of the second struts 72b abuts on each of the second step portions 82b, as shown in FIG. 3. Thus, the input-side rotary member 68 and the second output-side rotary member 70b are kept from rotating relatively to each other in the vehicle backward direction. In consequence, with the two-way clutch TWC in the lock mode, the first struts 72a and the second struts 72b each function as a one-way clutch, and the two-way clutch TWC makes it possible to transmit the motive power acting in the vehicle forward direction and the motive power acting in the vehicle backward direction to the driving wheels 14. Accordingly, the vehicle is enabled to run backward by changing over the two-way clutch TWC to the lock mode when the vehicle runs backward. Besides, when the vehicle 10 assumes the driven state by being caused to coast while running forward, the rotation transmitted from the driving wheel 14 sides is transmitted to the engine 12 side via the two-way clutch TWC, by changing over the two-way clutch TWC to the lock mode. Thus, engine braking can be caused through the dragging of the engine 12. In consequence, with the two-way clutch TWC in the lock mode, the first struts 72a and the second struts 72b each function as a one-way clutch, and the motive power is transmitted when the vehicle 10 is in the driving state and the driven state.

FIG. 4 is an engagement operation chart showing an engagement state of each of the engagement devices at each operation position POSsh selected by a shift lever 98 as a shift changeover device with which the vehicle 10 is equipped. In FIG. 4, "C1" corresponds to the first clutch C1, "C2" corresponds to the second clutch C2, "B1" corresponds to the first brake B1, and "TWC" corresponds to the two-way clutch TWC. Besides, "P (a P position)", "R (an R position)", "N (an N position)", "D (a D position)", and "M (an M position)" indicate the respective operation positions POSsh selected by the shift lever 98. Besides, each circle in FIG. 4 indicates engagement of each of the engagement devices, and each blank in FIG. 4 indicates release thereof. Incidentally, as regards "TWC" corresponding to the two-way clutch TWC, each circle indicates a changeover of the two-way clutch TWC to the lock mode, and each blank indicates a changeover of the two-way clutch TWC to the one-way mode.

For example, when the operation position POSsh of the shift lever 98 is changed over to the P position as a vehicle stop position or the N position as a power transmission block position, the first clutch C1, the second clutch C2, and the first brake B1 are released as shown in FIG. 4. At this time, a neutral state where the motive power is transmitted in neither the first power transmission path PT1 nor the second power transmission path PT2 is established.

Besides, when the operation position POSsh of the shift lever 98 is changed over to the R position as a backward running position, the first brake B1 is engaged, and the two-way clutch TWC is changed over to the lock mode, as shown in FIG. 4. The motive power acting in the backward direction from the engine 12 side is transmitted to the gear mechanism 28 by engaging the first brake B1. At this time, when the two-way clutch TWC is in the one-way mode, the motive power is blocked by the two-way clutch TWC, so the vehicle cannot run backward. Thus, the motive power acting in the vehicle backward direction is transmitted to the output shaft 30 side via the two-way clutch TWC, by changing over the two-way clutch TWC to the lock mode. Therefore, the vehicle can run backward. In consequence, when the operation position POSsh is changed over to the R position, the first brake B1 is engaged, and the two-way clutch TWC is changed over to the lock mode. Thus, a backward gear stage where the motive power in the vehicle backward direction is transmitted via the first power transmission path PT1 (the gear mechanism 28) is formed.

Besides, when the operation position POSsh of the shift lever 98 is changed over to the D position as a forward running position, the first clutch C1 is engaged, or the second clutch C2 is engaged, as shown in FIG. 4. "D1 (a D1 position)" and "D2 (a D2 position)" shown in FIG. 4 are virtual operation positions that are set in terms of control. When the operation position POSsh is changed over to the D position, a changeover to the D1 position or the D2 position is automatically made in accordance with the running state of the vehicle 10. The changeover to the D1 position is made in a relatively low vehicle speed range including the stoppage of the vehicle. The changeover to the D2 position is made in a relatively high vehicle speed range including an intermediate vehicle speed range. When the running state of the vehicle 10 shifts, for example, from the low vehicle speed range to the high vehicle speed range, for example, while the vehicle runs at the D position, a changeover from the D1 position to the D2 position is automatically made.

For example, if the running state of the vehicle 10 is in a running range corresponding to the D1 position when the operation position POSsh is changed over to the D position, the first clutch C1 is engaged, and the second clutch C2 is released. At this time, a gear running mode in which the motive power acting in the vehicle forward direction from the engine 12 side is transmitted to the driving wheels 14 via the first power transmission path PT1 (the gear mechanism 28) is established. Incidentally, the two-way clutch TWC has been changed over to the one-way mode, and hence transmits the motive power acting in the vehicle forward direction.

Besides, if the running state of the vehicle 10 is in a running range corresponding to the D2 position when the operation position POSsh is changed over to the D position, the first clutch C1 is released, and the second clutch C2 is engaged. At this time, a belt running mode in which the motive power acting in the forward direction from the engine 12 side is transmitted to the driving wheels 14 via the second power transmission path PT2 (the continuously variable transmission 24) is established. Thus, when the operation position POSsh is changed over to the D position, the motive power of the engine 12 is transmitted to the driving wheels 14 via the first power transmission path PT1 (the gear mechanism 28) or the second power transmission path PT2 (the continuously variable transmission 24), in accordance with the running state of the vehicle 10.

Besides, when the operation position POSsh of the shift lever 98 is changed over to the M position, a changeover to upshift or downshift can be made through manual operation by the driver. That is, the M position is a manual shift position at which shifting through manual operation by the driver is possible. For example, when the driver performs manual operation toward the downshift side with the operation position POSsh changed over to the M position, a forward gear stage where the first clutch C1 is engaged and the two-way clutch TWC is changed over to the lock mode is formed. Besides, the two-way clutch TWC enables transmission of the motive power both when the vehicle 10 is in the driving state and when the vehicle 10 is in the driven state, by changing over the two-way clutch TWC to the lock mode. For example, the vehicle is in the driven state where rotation is transmitted from the driving wheel 14 sides, while coasting. However, when manual operation is performed toward the downshift side at the M position in this case, the rotation transmitted from the driving wheel 14 sides is transmitted to the engine 12 side via the two-way clutch TWC. Thus, the engine 12 is dragged, so engine braking can be caused. As described hitherto, when the operation position POSsh is downshifted at the M position, the motive power is transmitted to the driving wheels 14 via the first power transmission path PT1 (the gear mechanism 28), and the rotation transmitted from the driving wheel 14 sides is transmitted to the engine 12 side via the first power transmission path PT1 while the vehicle coasts. Thus, the forward gear stage where engine braking can be caused is formed.

Besides, when the driver performs manual operation toward the upshift side with the operation position POSsh of the shift lever 98 changed over to the M position, the second clutch C2 is engaged. At this time, a forward continuous shift stage at which the motive power is transmitted to the driving wheels 14 via the second power transmission path PT2 (the continuously variable transmission 24) is formed. As described hitherto, when the operation position POSsh is changed over to the M position, manual shift for making a changeover to one of the forward gear stage (i.e., the gear running mode) where the motive power is transmitted via the first power transmission path PT1 and the forward continuous shift stage (i.e., the belt running mode) where the motive power is transmitted via the second power transmission path PT2 is made possible through manual operation by the driver. Incidentally, the case where the operation position POSsh has been downshifted at the M position corresponds to the M1 position of FIG. 4, and the case where the operation position POSsh has been upshifted at the M position corresponds to the M2 position of FIG. 4. This M1 position and this M2 position apparently do not exist. However, in the following, it will be described, for the sake of convenience, that a changeover to the M1 position has been made when the operation position POSsh is manually operated toward the downshift side at the M position, and it will be described, for the sake of convenience, that a changeover to the M2 position has been made when the operation position POSsh is manually operated toward the upshift side at the M position.

Returning to FIG. 1, the vehicle 10 is equipped with the electronic control unit 100 as a controller including a control device for the power transmission device 16. The electronic control unit 100 is configured to include a so-called microcomputer that is equipped with, for example, a CPU, a RAM, a ROM, an input/output interface and the like. The CPU performs various kinds of control of the vehicle 10 by performing signal processing in accordance with a program stored in advance in the ROM, while utilizing a temporary storage function of the RAM. The electronic control unit 100 performs output control of the engine 12, shift control and belt clamping force control of the continuously variable transmission 24, oil pressure control for changing over the operating state of each of the plurality of the engagement devices (C1, B1, C2, TWC), and the like. The electronic control unit 100 is configured, if necessary, as separate units for engine control, oil pressure control, and the like.

Various detection signals and the like (e.g., an engine rotational speed Ne, a primary rotational speed Npri as a value equal to the input shaft rotational speed Nin, a secondary rotational speed Nsec, the output shaft rotational speed Nout corresponding to a vehicle speed V, an input rotational speed Ntwcin of the input-side rotary member 68 constituting the two-way clutch TWC, an acceleration operation amount θacc of the accelerator pedal 45 representing the magnitude of acceleration operation by the driver, a throttle opening degree tap, the operation position POSsh of the shift lever 98 as the shift changeover device with which the vehicle 10 is equipped, a working fluid temperature THoil as a temperature of working fluid in the oil pressure control circuit 46, and the like) obtained by various sensors and the like with which the vehicle 10 is equipped (e.g., various rotational speed sensors 102, 104, 106, 108, and 109, an accelerator operation amount sensor 110, a throttle opening degree sensor 112, a shift position sensor 114, an oil temperature sensor 116, and the like) are supplied to the electronic control unit 100. Incidentally, the input shaft rotational speed Nin (=the primary rotational speed Npri) is also a turbine rotational speed NT. Besides, the electronic control unit 100 calculates an actual speed ratio γcvt (=Npri/Nsec) as the real speed ratio γcvt of the continuously variable transmission 24 based on the primary rotational speed Npri and the secondary rotational speed Nsec. Besides, the electronic control unit 100 calculates an output rotational speed Ntwcout of the first output-side rotary member 70a and the second output-side rotary member 70b (hereinafter referred to as the output-side rotary member 70 when these members are not distinguished from each other) that constitute the two-way clutch TWC, based on the output shaft rotational speed Nout.

Various command signals (e.g., an engine control command signal Se for controlling the engine 12, an oil pressure control command signal Scvt for controlling the shifting, belt clamping force, and the like of the continuously variable transmission 24, an oil pressure control command signal Scbd for controlling the operating state of each of the plurality of the engagement devices, an oil pressure control command signal Slu for controlling the operating state of the lockup clutch LU, and the like) are output from the electronic control unit 100 to the respective devices with which the vehicle 10 is equipped (e.g., the engine control device 42, the oil pressure control circuit 46, and the like) respectively.

Upon receiving these various command signals, the oil pressure control circuit 46 outputs an SL1 oil pressure Psl1 as an oil pressure supplied to a hydraulic actuator of the first clutch C1, a B1 control pressure Pb1 as an oil pressure supplied to a hydraulic actuator of the first brake B1, an SL2 oil pressure Psl2 as an oil pressure supplied to a hydraulic actuator of the second clutch C2, a TWC oil pressure Ptwc as an oil pressure supplied to the hydraulic actuator 41 that changes over the mode of the two-way clutch TWC, a primary pressure Ppri supplied to the hydraulic actuator 60a of the primary pulley 60, a secondary pressure Psec supplied to the hydraulic actuator 64a of the secondary pulley 64, an LU pressure Plu for controlling the lockup clutch LU, and the like. Incidentally, the SL1 oil pressure Psl1, the SL2 oil pressure Psl2, the B1 control pressure Pb1, the TWC oil pressure Ptwc, the primary pressure Ppri, the secondary pressure Psec, the LU pressure Plu are directly or indirectly adjusted by electromagnetic valves (not shown) with which the oil pressure control circuit 46 is equipped, respectively.

In order to realize the various kinds of control in the vehicle 10, the electronic control unit 100 is functionally equipped with an engine control unit 120 that functions as engine control means, and a shift control unit 122 that functions as shift control means.

The engine control unit 120 calculates a required driving force Fdem by applying the accelerator operation amount θacc and the vehicle speed V to, for example, a driving force map, which is a relationship obtained in advance experimentally or in terms of design and stored, namely, a relationship determined in advance. The engine control unit 120 sets a target engine torque Tet at which the required driving force Fdem is obtained, and outputs a command to control the engine 12 to the engine control device 42 such that the target engine torque Tet is obtained.

For example, when the operation position POSsh is changed over from the P position or the N position to, for example, the D position, for example, during the stoppage of the vehicle, the shift control unit 122 outputs a command to engage the first clutch C1 to the oil pressure control circuit 46. Thus, the vehicle 10 is changed over to a forward gear running mode in which the vehicle is enabled to run forward via the first power transmission path PT1. Besides, when the operation position POSsh is changed over from the P position or the N position to the R position during the stoppage of the vehicle, the shift control unit 122 engages the first brake B1, and outputs a command to change over the two-way clutch TWC to the lock mode to the oil pressure control circuit 46. Thus, the vehicle 10 is changed over to a backward gear running mode in which the vehicle is enabled to run backward via the first power transmission path PT1.

Besides, the shift control unit 122 outputs, to the oil pressure control circuit 46, a command to control a gear ratio γ of the continuously variable transmission 24 to a target gear ratio ytgt that is calculated based on an accelerator operation amount θacc, the vehicle speed V, and the like, for example, while running in the belt running mode via the second power transmission path PT2. In concrete terms, while adjusting the belt clamping pressure of the continuously variable transmission 24 to an optimal value, the shift control unit 122 stores a relationship determined in advance (e.g., a shift map) for achieving the target gear ratio ytgt of the continuously variable transmission 24 at which an operating point of the engine 12 is on a predetermined optimal line (e.g., an engine optimal fuel consumption line), determines, from the relationship, a primary command pressure Ppritgt as a command value of the primary pressure Ppri supplied to the hydraulic actuator 60a of the primary pulley 60, and a secondary command pressure Psectgt as a command value of the secondary pressure Psec supplied to the hydraulic actuator 64a of the secondary pulley 64, based on the accelerator operation amount θacc, the vehicle speed V, and the like, outputs, to the oil pressure control circuit 46, a command to control the primary pressure Ppri and the secondary pressure Psec to the primary command pressure Ppritgt and the secondary command pressure Psectgt respectively, and carries out the shifting of the continuously variable transmission 24. Incidentally, shift control of the continuously variable transmission 24 is a known art, so the detailed description thereof will be omitted.

Besides, when the operation position POSsh is the D position, the shift control unit 122 performs changeover control for making a changeover between the gear running mode and the belt running mode. In concrete terms, the shift control unit 122 stores a shift map as a relationship that is determined in advance to make a changeover between a first speed shift stage corresponding to the gear ratio EL of the gear mechanism 28 in the gear running mode, and a second speed shift stage corresponding to the lowermost speed ratio γmax of the continuously variable transmission 24 in the belt running mode. The shift map is constituted of the vehicle speed V, the accelerator operation amount θacc, and the like. An upshift line for making a determination on an upshift to the second speed shift stage, namely, a changeover to the belt running mode, and a downshift line for making a determination on a downshift to the first speed shift stage, namely, a changeover to the gear running mode are set on the shift map. The shift control unit 122 determines whether or not shifting is necessary, by applying the actual vehicle speed V and the actual accelerator operation amount θacc to the shift map, and carries out shifting (i.e., a changeover between the running modes) based on a result of the determination. For example, a downshift to the first speed shift stage (the gear running mode) is determined (a downshift request) when the downshift line is crossed during the running in the belt running mode, and an upshift to the second speed shift stage (the belt running mode) is determined (an upshift request) when the upshift line is crossed during the running in the gear running mode. Incidentally, the gear running mode corresponds to the D1 position of FIG. 4, and the belt running mode corresponds to the D2 position of FIG. 4.

For example, it is determined that when an upshift for making a changeover to the belt running mode (corresponding to the D2 position) should be carried out during the running in the gear running mode (corresponding to the D1 position) with the operation position POSsh being the D position, the shift control unit 122 outputs, to the oil pressure control circuit 46, a command to release the first clutch C1 and engage the second clutch C2. Thus, the power transmission path PT in the power transmission device 16 is changed over from the first power transmission path PT1 to the second power transmission path PT2. In this manner, the shift control unit 122 makes a changeover from the gear running mode in which the motive power is transmitted via the first power transmission path PT1 to the belt running mode in which the motive power is transmitted via the second power transmission path PT2, through staged shift control (upshift control) for releasing the first clutch C1 and engaging the second clutch C2.

When the running mode is changed over to the belt running mode, the motive power is transmitted via the second power transmission path PT2 (the continuously variable transmission 24) in the power transmission device 16. At this time, the rotation of the driving wheels 14 is transmitted to the counter gear 54 via the differential device 38, the reduction gear device 34, the output gear 56, and the like. However, since the two-way clutch TWC is rendered in the one-way mode, the rotation of the counter gear 54 is blocked by the two-way clutch TWC, and no rotation is transmitted to the gear mechanism 28 side. Accordingly, no rotation is transmitted to the gear mechanism 28 side even when the vehicle speed V becomes high. Therefore, the gear mechanism 28 and the first clutch C1 are prevented from rotating at high speed when the vehicle runs at high vehicle speed.

Besides, when the operation position POSsh is changed over to the M2 position while the vehicle runs with the operation position POSsh being the M1 position, the shift control unit 122 outputs, to the oil pressure control circuit 46, a command to release the first clutch C1 and engage the second clutch C2, so as to make a changeover from the gear running mode to the belt running mode. Furthermore, the shift control unit 122 outputs, to the oil pressure control circuit 46, a command to change over the two-way clutch TWC from the lock mode to the one-way mode.

By the way, the M1 position is a forward running gear stage at which engine braking can be caused. Therefore, with the operation position POSsh changed over to the M1 position, the vehicle is often in the driven state where the input shaft 22 and the engine 12 are dragged through the rotation transmitted from the driving wheel 14 sides. When the operation position POSsh is changed over to the M2 position in this state, the TWC oil pressure Ptwc of the hydraulic actuator 41 that controls the operation of the two-way clutch TWC is controlled to zero, so as to change over the two-way clutch TWC to the one-way mode. It should be noted herein that with the first clutch C1 engaged, one end of each of the second struts 72b and each of the second wall surfaces 80b of the second output-side rotary member 70b abut on each other as shown in FIG. 3 and apply a force to each other. Therefore, each of the second struts 72b and each of the second wall surfaces 80b are not stopped from abutting on each other, and it may be impossible to change over the two-way clutch TWC to the one-way mode. Besides, when the vehicle speed V becomes high with the two-way clutch TWC in the lock mode, the rotation of the driving wheels 14 is transmitted to the first clutch C1 via the two-way clutch TWC and the gear mechanism 28. Thus, the first clutch C1 may be rotated at high speed.

In order to eliminate the aforementioned problems, the shift control unit 122 performs the control of changing over the two-way clutch TWC to the one-way mode while releasing the first clutch C1 when a request is made to make a changeover to the M2 position while the vehicle is in the driven state and runs at the M1 position with the two-way clutch TWC in the lock mode, and performs the control of engaging the second clutch C2 when the two-way clutch TWC is changed over to the one-way mode, thereby making it possible to change over the two-way clutch TWC to the one-way mode even in the driven state. The control of making it possible to change over the two-way clutch TWC to the one-way mode even in the driven state will be described hereinafter.

In order to perform the aforementioned control, the shift control unit 122 is functionally equipped with a changeover request determination unit 126 that functions as changeover request determination means, and a changeover completion determination unit 128 that functions as changeover completion determination means. Incidentally, the shift control unit 122 corresponds to the control unit of the disclosure.

The changeover request determination unit 126 determines whether or not the operation position POSsh has been changed over to the M2 position while the vehicle 10 is in the driven state and runs with the two-way clutch TWC in the lock mode. That is, the changeover request determination unit 126 determines whether or not an upshift request for a changeover of the power transmission path from the first power transmission path PT1 (the gear running mode or the first shift stage) to the second power transmission path PT2 (the belt running mode or the second shift stage) has been made while the vehicle 10 is in the driven state and runs with the two-way clutch TWC in the lock mode. It is determined whether or not the vehicle 10 is in the driven state, for example, based on whether or not the vehicle speed V is equal to or higher than a predetermined vehicle speed and the accelerator operation amount θacc is equal to zero. Besides, it is determined whether or not the two-way clutch TWC is in the lock mode, for example, based on whether or not the operation position POSsh is the M1 position.

When the changeover request determination unit 126 determines that the upshift request has been made, the shift control unit 122 outputs, to the oil pressure control circuit 46, a command to reduce a C1 control pressure Pc1 for controlling the first clutch C1 to zero, so as to release the first clutch C1. When the first clutch C1 is released, the input-side rotary member 68 is disconnected from the first clutch C1, and there is no force applied between one end of each of the second struts 72b and each of the second wall surfaces 80b of the second output-side rotary member 70b. Therefore, the two-way clutch TWC can be changed over to the one-way mode. Subsequently, the shift control unit 122 outputs, to the oil pressure control circuit 46, a command to reduce the TWC oil pressure Ptwc for controlling the two-way clutch TWC to zero, so as to change over the two-way clutch TWC to the one-way mode.

The changeover completion determination unit 128 determines whether or not a difference in rotational speed ΔNtwc (|Ntwcin−Ntwcout|) between the input rotational speed Ntwcin of the input-side rotary member 68 and the output rotational speed Ntwcout of the output-side rotary member 70 is equal to or larger than a determination threshold α1 set in advance. The determination threshold α1 is set as a threshold equal to a value that is obtained experimentally or in terms of design and that makes it possible to determine that the two-way clutch TWC has been changed over to the one-way mode. In the driven state, when the two-way clutch TWC enters the one-way mode, no motive power is transmitted to the input-side rotary member 68 side, so the input rotational speed Ntwcin falls, and the output rotational speed Ntwcout of the output-side rotary member 70 rotates at a rotational speed corresponding to the vehicle speed V. Accordingly, the difference in rotational speed ΔNtwc increases with the lapse of time. This means that the changeover completion determination unit 128 has a function of determining whether or not the two-way clutch TWC has been changed over to the one-way mode.

Besides, the changeover completion determination unit 128 may determine that the two-way clutch TWC has been changed over to the one-way mode when a changeover completion time β set in advance elapses since the start of the changeover to the one-way mode, instead of determining, based on the aforementioned difference in rotational speed ΔNtwc, whether or not the two-way clutch TWC has been changed over to the one-way mode. The changeover completion time β is a value that is obtained in advance experimentally or in terms of design, and is set to a time from the start of the changeover of the two-way clutch TWC to the one-way mode to the completion of the changeover of the two-way clutch TWC to the one-way mode.

When the changeover completion determination unit 128 determines that the two-way clutch TWC has been changed over to the one-way mode, the shift control unit 122 starts engaging the second clutch C2. As described above, the first clutch C1 is first released to enable the two-way clutch TWC to be changed over to the one-way mode, and then, the two-way clutch TWC is changed over to the one-way mode. Besides, when the two-way clutch TWC changes over to the one-way mode, the second clutch C2 is engaged. Therefore, the two-way clutch TWC can be reliably changed over to the one-way mode before the second clutch C2 is engaged. In this connection, the two-way clutch TWC is held in the lock mode, and furthermore, the vehicle speed V becomes high. Thus, the rotation of the driving wheels 14 that has become high is transmitted to the first clutch C1 via the two-way clutch TWC. As a result, it is also possible to prevent the first clutch C1 from being rotated at high speed.

Figure 5:
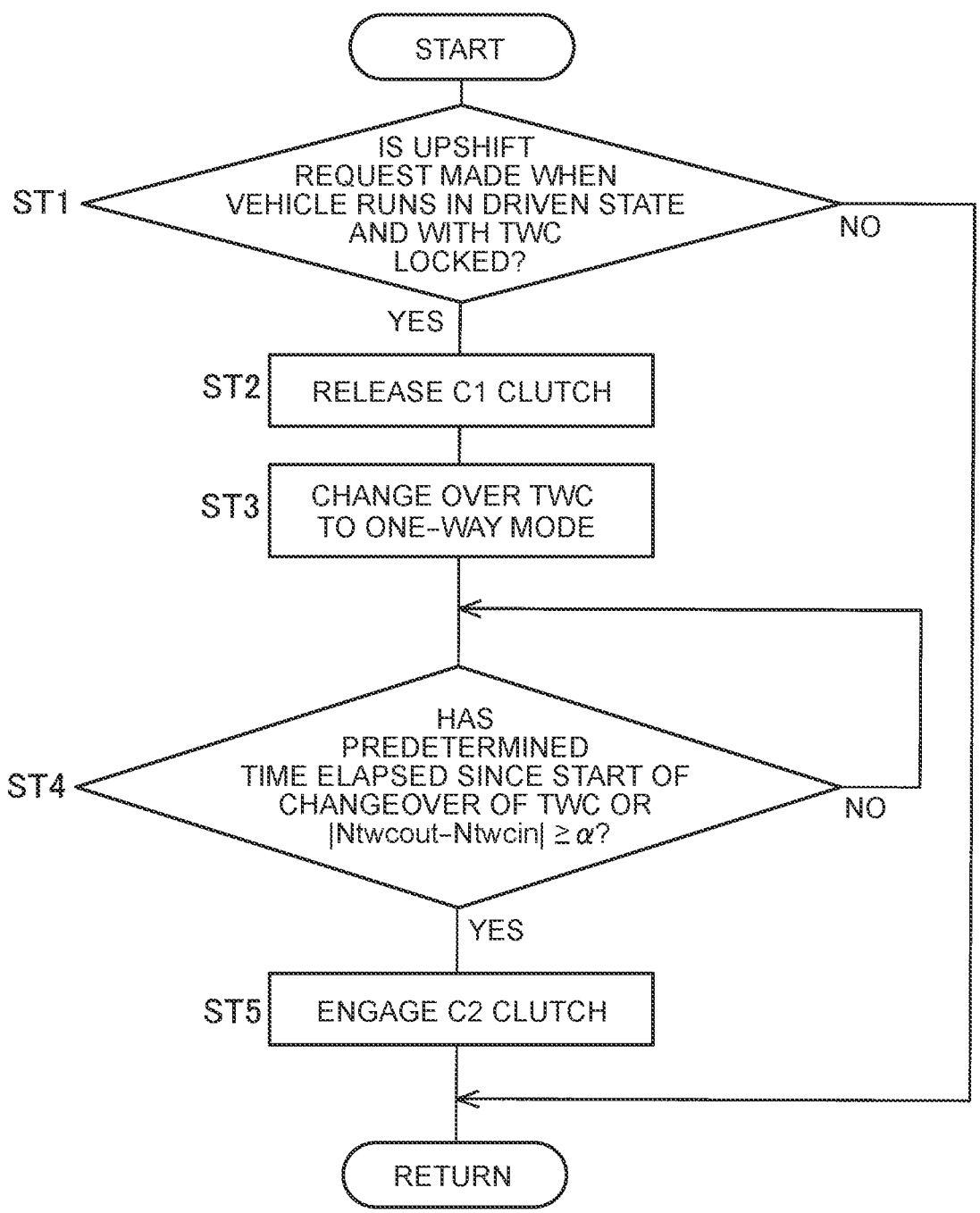
FIG. 5 is a flowchart illustrating an essential part of a control operation of an electronic control unit of FIG. 1, namely, a control operation upon the making of an upshift request for a changeover to a belt running mode while the vehicle is in a driven state and runs with the two-way clutch in the lock mode.

FIG. 5 is a flowchart illustrating an essential part of the control operation of the electronic control unit 100, namely, the control operation at the time when an upshift request for a changeover to the belt running mode is made while the vehicle is in the driven state and runs in the gear running mode with the two-way clutch TWC in the lock mode. This flowchart is repeatedly carried out during the running of the vehicle.

First of all, in step ST1 (the term "step" will be omitted hereinafter) corresponding to the control function of the changeover request determination unit 126, it is determined whether or not an upshift request for a changeover from the gear running mode to the belt running mode has been made by changing over the operation position POSsh to the M2 position while the vehicle 10 is in the driven state and runs in the gear running mode with the operation position POSsh being the M position and with the two-way clutch TWC in the lock mode. If the result of ST1 is negative, the present routine is ended. If the result of ST1 is positive, the control of releasing the first clutch C1 is started in ST2 corresponding to the control function of the shift control unit 122. Subsequently, in ST3 corresponding to the control function of the shift control unit 122, the two-way clutch TWC is changed over to the one-way mode.

In ST4 corresponding to the control function of the changeover completion determination unit 128, it is determined whether or not the two-way clutch TWC has been changed over to the one-way mode, based on whether or not the difference in rotational speed ΔNtwc between the output rotational speed Ntwcout of the output-side rotary member 70 and the input rotational speed Ntwcin of the input-side rotary member 68 has become equal to or larger than the determination threshold α1. Alternatively, it is determined whether or not the two-way clutch TWC has been changed over to the one-way mode, based on whether or not the changeover completion time β has elapsed since the start of the changeover of the two-way clutch TWC to the one-way mode. If the result of ST4 is negative, ST4 is repeatedly carried out until the difference in rotational speed ΔNtwc becomes equal to or larger than the determination threshold α1 or until the changeover completion time β elapses since the start of the changeover to the one-way mode. When the difference in rotational speed ΔNtwc becomes equal to or larger than the determination threshold α1 or when the elapsed time since the start of the changeover to the one-way mode reaches the changeover completion time β, it is determined that the two-way clutch TWC has been changed over to the one-way mode, and the result of ST4 becomes positive. If the result of ST4 is positive, the engagement of the second clutch C2 is started in ST5 corresponding to the control function of the shift control unit 122.

Figure 6:
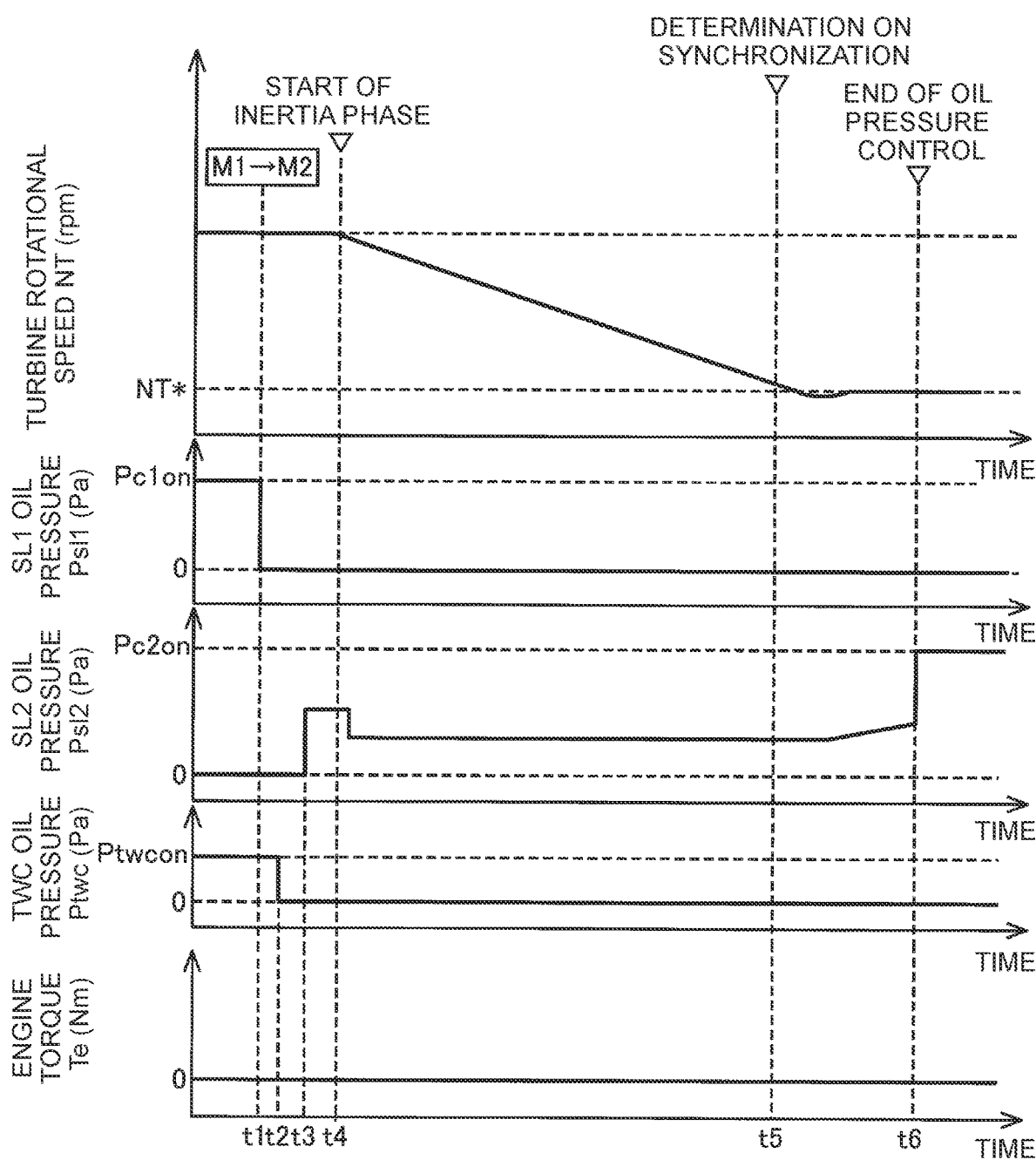
FIG. 6 is a time chart showing a control result that is based on the flowchart of FIG. 5 and that is obtained upon a changeover to an M2 position while the vehicle is in the driven state and runs at an M1 position.

FIG. 6 is a time chart showing a control result based on the flowchart of FIG. 5. FIG. 6 shows a control result at the time when a changeover to the M2 position is made while the vehicle is in the driven state and runs at the M1 position.

In FIG. 6, the axis of ordinate represents, sequentially from above, the turbine rotational speed NT corresponding to the input shaft rotational speed Nin of the input shaft 22, the SL1 oil pressure Psl1 for controlling the torque capacity of the first clutch C1, the SL2 oil pressure Psl2 for controlling the torque capacity of the second clutch C2, the TWC oil pressure Ptwc for changing over the mode of the two-way clutch TWC, and the engine torque Te. In FIG. 6, the first clutch C1 is released when the SL1 oil pressure Psl1 is controlled to zero, and the first clutch C1 is engaged when the SL1 oil pressure Psl1 is controlled to an oil pressure Pc1on. The second clutch C2 is released when the SL2 oil pressure Psl2 is controlled to zero, and the second clutch C2 is engaged when the SL2 oil pressure Psl2 is controlled to an oil pressure Pc2on. The two-way clutch TWC is changed over to the one-way mode when the TWC oil pressure Ptwc is controlled to zero, and the two-way clutch TWC is changed over to the lock mode when the TWC oil pressure Ptwc is controlled to the oil pressure Ptwcon. Incidentally, each of the SL1 oil pressure Psl1, the SL2 oil pressure Psl2, and the TWC oil pressure Ptwc shown in FIG. 6 is a command pressure. The actual oil pressure follows each command pressure with a predetermined delay.

When the operation position POSsh is changed over from the M1 position to the M2 position at a timing t1 shown in FIG. 6 while the vehicle runs in the driven state, the SL1 oil pressure Psl1 is controlled to zero to release the first clutch C1. Besides, the TWC oil pressure Ptwc is controlled to zero to change over the two-way clutch TWC to the one-way mode at a timing t2 when a predetermined delay time tdelay has elapsed since the timing t1. The delay time tdelay set between the timing t1 and the timing t2 is obtained in advance experimentally or in terms of design. For example, the delay time tdelay is set to a value at which the actual SL1 oil pressure Psl1 becomes equal to or lower than a predetermined value and the torque capacity of the first clutch C1 is equal to zero or has decreased to such an extent that the two-way clutch TWC can be changed over to the one-way mode, at a timing when the changeover of the two-way clutch TWC to the one-way mode is started.

At a timing t3, for example, the difference in rotational speed ΔNtwc between the output rotational speed Ntwcout and the input rotational speed Ntwcin becomes equal to or larger than the determination threshold α1. It is thus determined that the two-way clutch TWC has been changed over to the one-way mode, and the engagement of the second clutch C2 is started. In concrete terms, at the timing t3, quick fill for temporarily raising the SL2 oil pressure Psl2 is carried out to enhance the responsiveness of the SL2 oil pressure Psl2 (an actual pressure) for controlling the second clutch C2. Besides, at a timing t4, the raising of the turbine rotational speed NT is started (the start of an inertia phase) as the first clutch C1 is released and the torque capacity of the second clutch C2 is increased. From the timing t4 to a timing t5, the SL2 oil pressure Psl2 is controlled such that the turbine rotational speed NT changes at a predetermined gradient toward a target rotational speed NT* after the changeover to the belt running mode.

At the timing t5, a difference in rotational speed ΔNT between the target rotational speed NT* and the turbine rotational speed NT becomes equal to or smaller than a synchronization determination threshold α2 set in advance, and it is hence determined that the turbine rotational speed NT has synchronized with the target rotational speed NT*. At a timing t6, the oil pressure Psl2 is raised to the oil pressure Pc2on at which the second clutch C2 is engaged, and the changeover to the belt running mode is completed. In this manner, since the release of the first clutch C1 is first started at the timing t1, the two-way clutch TWC can be changed over to the one-way mode even in the driven state. When the two-way clutch TWC is changed over to the one-way mode, the second clutch C2 is engaged. Thus, a changeover to the belt running mode is prevented from being made with the two-way clutch TWC held in the lock mode.

As described above, according to the present embodiment, when a request is made to change over the power transmission path PT from the first power transmission path PT1 to the second power transmission path PT2 while the vehicle is in the driven state and runs with the two-way clutch TWC in the lock mode, the first clutch C1 is released, so the first power transmission path PT1 assumes the neutral state. The two-way clutch TWC can be reliably changed over to the one-way mode, by performing the control of changing over the two-way clutch TWC to the one-way mode in this state.

Besides, according to the present embodiment, it can be easily determined that the two-way clutch TWC has been changed over to the one-way mode, by calculating the difference in rotational speed ΔNtwc between the output rotational speed Ntwcout of the output-side rotary member 70 and the input rotational speed Ntwcin of the input-side rotary member 68. Alternatively, it can be easily determined that the two-way clutch TWC has been changed over to the one-way mode, by detecting the elapsed time since the start of the changeover of the two-way clutch TWC to the one-way mode.

Although the embodiment of the disclosure has been described above in detail based on the drawings, the disclosure is applicable in other aspects as well.

For example, in the foregoing embodiment, when the operation position POSsh is changed over to the M2 position, the TWC oil pressure Ptwc for controlling the two-way clutch TWC is controlled to zero after the lapse of the delay time tdelay since the start of the release of the first clutch C1. However, the TWC oil pressure Ptwc may be controlled to zero as soon as the release of the first clutch C1 is started. The two-way clutch TWC is configured to be changed over to the one-way mode by a spring (not shown), with no oil pressure supplied to the actuator 41. Accordingly, when the TWC oil pressure Ptwc is controlled to zero upon the start of the release of the first clutch C1, the two-way clutch TWC changes over to the one-way mode as the torque capacity of the first clutch C1 decreases, although the two-way clutch TWC does not change over to the one-way mode immediately after the start of the release of the first clutch C1. Accordingly, the two-way clutch TWC is changed over to the one-way mode before the second clutch C2 is engaged, so an effect similar to that of the foregoing embodiment can be obtained. Furthermore, the control for making the TWC oil pressure Ptwc equal to zero may be started first, and then, the release of the first clutch C1 may be started, when the operation position POSsh is changed over to the M2 position.

Besides, in the foregoing embodiment, the case where the changeover to the M2 position is made while the vehicle is in the driven state and runs at the M1 position has been described. However, the disclosure is also applicable to a case where a changeover to the D position is made while the vehicle is in the driven state and runs at the M1 position. In concrete terms, when the running state of the vehicle 10 upon the changeover to the D position is in a belt running mode region across the upshift line on the shift map, a changeover from the M1 position to the belt running mode corresponding to the D2 position is made. The disclosure is applicable to this case as well. Incidentally, the concrete contents of control are basically not different from those in the above-mentioned case where the changeover to the M2 position is made, so the detailed description thereof will be omitted.

Besides, in the foregoing embodiment, the two-way clutch TWC is configured to transmit the motive power when the vehicle 10 is in the driving state while running forward in the one-way mode, and to transmit the motive power in the driving direction and the driven direction of the vehicle 10 in the lock mode, but the two-way clutch of the disclosure is not necessarily limited thereto. For example, a free mode in which the transmission of the motive power is blocked with the vehicle 10 in the driving state and the driven state may be added to the one-way mode and the lock mode of the two-way clutch.

Besides, in the foregoing embodiment, the structure of the two-way clutch TWC is not necessarily limited to that of the present embodiment. For example, the two-way clutch may be constituted of a first one-way clutch and a second one-way clutch that are provided separately from each other, the first one-way clutch may be configured to enable transmission of the motive power acting in the forward direction of the vehicle 10, the second one-way clutch may be configured to enable the transmission of the motive power acting in the backward direction of the vehicle 10, and furthermore, the second one-way clutch may be configured to be changeable over to the mode in which the motive power acting in the backward direction of the vehicle 10 is blocked. Besides, the first one-way clutch may also be configured to be changeable over to the mode in which the motive power acting in the vehicle forward direction is blocked. In short, as long as the two-way clutch can be changed over at least to the one-way mode and the lock mode, the structure thereof can be changed as appropriate.

Besides, in the foregoing embodiment, each of the first struts 72a and the second struts 72b is configured as a plate-like member with a rectangularly-shaped cross-section, but is not necessarily required to assume the above-mentioned shape. For example, each of the first struts 72a and the second struts 72b may be formed in the shape of a circular cylinder. In short, any members that can keep the input-side rotary member 68 and the output-side rotary member 70 from rotating relatively to each other by abutting on the input-side rotary member 68 and the output-side rotary member 70 can be applied as appropriate.

Besides, in the foregoing embodiment, the determination on the lock mode of the two-way clutch TWC can also be made based on whether or not the difference $\Delta$Ntwc in rotational speed between the output rotational speed Ntwcout of the output-side rotary member 70 and the input rotational speed Ntwcin of the input-side rotary member 68 is smaller than a determination threshold set in advance.

Besides, in the foregoing embodiment, the gear ratio EL in the first power transmission path PT1 that is constituted of the gear mechanism 28 is set to a value larger than the lowermost speed ratio $\gamma$max of the continuously variable transmission 24 as the maximum speed ratio in the second power transmission path PT2, but the disclosure is not necessarily limited thereto. For example, the gear ratio EL may be set to a value smaller than the lowermost speed ratio $\gamma$max of the continuously variable transmission 24, namely, on the high side.

Incidentally, the foregoing is nothing more than the embodiment. The disclosure can be carried out in aspects subjected to various alterations and improvements based on the knowledge of those skilled in the art.

What is claimed is:

1. A power transmission device for a vehicle, the power transmission device comprising:

a first power transmission path that is provided between an engine and a driving wheel, the first power transmission path including a first clutch and a secondary clutch and being configured to transmit a motive power from the engine to the driving wheel by engaging the first clutch, the secondary clutch configured to transmit the motive power to the driving wheel with the vehicle in a driving state, the secondary clutch being configured to make a changeover between a one-way mode and a lock mode, the one-way mode ensuring that the motive power is transmitted to the driving wheel with the vehicle in the driving state and that the motive power is blocked with the vehicle in a driven state, the lock mode ensuring that the motive power is transmitted to the driving wheel with the vehicle in the driving state and the driven state, the secondary clutch including an input-side rotary member, an output-side rotary member, and an intermediate member, the input-side rotary member being coupled to the engine in such a manner as to enable transmission of the motive power, the output-side rotary member being coupled to the driving wheel in such the manner as to enable transmission of the motive power, the intermediate member being interposed between the input-side rotary member and the output-side rotary member, and the intermediate member being configured to keep the input-side rotary member and the output-side rotary member from rotating relatively to each other, by abutting on the input-side rotary member and the output-side rotary member, when the vehicle assumes the driven state, in the lock mode;

a second power transmission path that is provided between the engine and the driving wheel and that is provided in parallel with the first power transmission path, the second power transmission path including a continuously variable transmission and a second clutch and being configured to transmit the motive power from the engine to the driving wheel by engaging the second clutch; and an electronic control unit that is configured to change over the secondary clutch to the one-way mode while releasing the first clutch when a request is made to change over a power transmission path between the engine and the driving wheel from the first power transmission path to the second power transmission path at a time of a predetermined state, the predetermined state being a state where the vehicle is in the driven state and runs with the secondary clutch in the lock mode, and the electronic control unit being configured to engage the second clutch when the secondary clutch is changed over to the one-way mode.

2. The power transmission device for the vehicle according to claim 1, wherein the electronic control unit is configured to determine that the secondary clutch has been changed over to the one-way mode, when a difference in rotational speed between an output rotational speed of the output-side rotary member of the secondary clutch and an input rotational speed of the input-side rotary member of the secondary clutch becomes equal to or larger than a determination threshold set in advance.

3. The power transmission device for the vehicle according to claim 1, wherein the electronic control unit is configured to determine that the secondary clutch has been changed over to the one-way mode, when an elapsed time since start of the changeover of the secondary clutch to the one-way mode becomes equal to or longer than a changeover completion time set in advance.

4. A control method of a power transmission device, the power transmission device including a first power transmission path that is provided between an engine and a driving wheel, a second power transmission path that is provided between the engine and the driving wheel and that is provided in parallel with the first power transmission path, and an electronic control unit, the first power transmission path including a first clutch and a secondary clutch, and being configured to transmit a motive power from the engine to the driving wheel by engaging the first clutch, the secondary clutch configured to transmit the motive power to the driving wheel with a vehicle in a driving state, the secondary clutch being configured to make a changeover between a one-way mode and a lock mode, the one-way mode ensuring that the motive power is transmitted to the driving wheel with the vehicle in the driving state and that the motive power is blocked with the vehicle in a driven state, the lock mode ensuring that the motive power is transmitted to the driving wheel with the vehicle in the driving state and the driven state, the secondary clutch including an input-side rotary member, an output-side rotary member, and an intermediate member, the input-side rotary member being coupled to the engine in such a manner as to enable transmission of the motive power, the output-side rotary member being coupled to the driving wheel in such the manner as to enable transmission of the motive power, the intermediate member being interposed between the input-side rotary member and the output-side rotary member, and the intermediate member being configured to keep the input-side rotary member and the output-side rotary member from rotating relatively to each other, by abutting on the input-side rotary member and the output-side rotary member, when the vehicle assumes the driven state, in the lock mode, and the second power transmission path including a continuously variable transmission and a second clutch and being configured to transmit the motive power from the engine to the driving wheel by engaging the second clutch, the method comprising:

changing over, by the electronic control unit, the secondary clutch to the one-way mode while releasing, by the electronic control unit, the first clutch when a request is made to change over a power transmission path between the engine and the driving wheel from the first power transmission path to the second power transmission path at a time of a predetermined state, the predetermined state being a state where the vehicle is in the driven state and runs with the secondary clutch in the lock mode; and engaging, by the electronic control unit, the second clutch when the secondary clutch is changed over to the one-way mode.

* * * * *